(12) United States Patent
Bos

(10) Patent No.: US 10,753,776 B2
(45) Date of Patent: Aug. 25, 2020

(54) METHOD FOR DETERMINING A FLOW PROFILE, MEASUREMENT TRANSDUCER, MAGNETIC-INDUCTIVE FLOWMETER AND METHOD OF USING A MAGNETIC-INDUCTIVE FLOWMETER

(71) Applicant: KROHNE AG, Basel (CH)

(72) Inventor: Maarten Hijbrand Bos, Zwijndrecht (NL)

(73) Assignee: KROHNE AG, Basel (CH)

( * ) Notice: Subject to any disclaimer, the term of this patent is extended or adjusted under 35 U.S.C. 154(b) by 260 days.

(21) Appl. No.: 15/920,852

(22) Filed: Mar. 14, 2018

(65) Prior Publication Data

US 2018/0266859 A1 Sep. 20, 2018

(30) Foreign Application Priority Data

Mar. 15, 2017 (DE) .......................... 10 2017 105 547

(51) Int. Cl.
*G01F 1/58* (2006.01)

(52) U.S. Cl.
CPC ................ *G01F 1/588* (2013.01); *G01F 1/58* (2013.01)

(58) Field of Classification Search
CPC . G01F 1/58; G01F 1/584; G01F 1/586; G01F 1/588
USPC ............... 73/861.08, 861.11, 861.12, 861.15
See application file for complete search history.

(56) References Cited

U.S. PATENT DOCUMENTS

| | | | |
|---|---|---|---|
| 5,280,727 A * | 1/1994 | Hafner | G01F 1/584 73/861.11 |
| 5,493,914 A | 2/1996 | Schäfer | |
| 5,646,353 A | 7/1997 | Mesch et al. | |
| 6,634,238 B2 | 10/2003 | Budmiger | |
| 2014/0083199 A1 | 3/2014 | Rogers | |

FOREIGN PATENT DOCUMENTS

| | | |
|---|---|---|
| DE | 10244646 A1 | 4/2004 |
| EP | 3184969 A1 | 6/2017 |
| WO | 2017/025314 A1 | 2/2017 |

* cited by examiner

*Primary Examiner* — Benjamin R Schmitt
(74) *Attorney, Agent, or Firm* — David S. Safran; Roberts Calderon Safran & Cole, P.C.

(57) ABSTRACT

A method for determining the flow profile in the measuring tube of a magnetic-inductive flowmeter and magnetic inductive flowmeter with which the method is performed, the method having the steps of supplying a first coil with current for generating a first magnetic field with a first exciting current, supplying a second coil with current for generating a second magnetic field with a second exciting current, measuring a first voltage at a first electrode as compared to a generated reference potential, measuring a second voltage at a second electrode as compared to the reference potential generated, and determining vertical and/or horizontal asymmetry of the flow profile from the first measured voltage value and from the second measured voltage value.

9 Claims, 6 Drawing Sheets

METHOD FOR DETERMINING A FLOW PROFILE, MEASUREMENT TRANSDUCER, MAGNETIC-INDUCTIVE FLOWMETER AND METHOD OF USING A MAGNETIC-INDUCTIVE FLOWMETER

BACKGROUND OF THE INVENTION

Field of the Invention

The invention is based on a method for determining the flow profile in the measuring tube of a magnetic-inductive flowmeter, wherein the flowmeter has at least one measurement transducer and at least one measurement sensor, wherein the measurement sensor has at least one measuring tube, at least a first coil for generating a first magnetic field within the measuring tube, at least a second coil for generating a second magnetic field within the measuring tube, at least a first electrode and at least a second electrode, wherein the first electrode and the second electrode are arranged in particular diametrically on the measuring tube for measuring a voltage occurring in the fluid, and wherein the measurement transducer has at least one control and evaluation unit.

Additionally, the invention relates to a measurement transducer for connection to a measurement sensor of a magnetic-inductive flowmeter comprising a control and evaluation unit.

Furthermore, the invention is based on a magnetic-inductive flowmeter having at least one measurement transducer and at least one measurement sensor, wherein the measurement sensor has at least one measuring tube, at least a first coil for generating a first magnetic field within the measuring tube, at least a second coil for generating a second magnetic field within the measuring tube, at least a first electrode and at least a second electrode, wherein the first electrode and the second electrode are arranged on the measuring tube for measuring a voltage occurring in the fluid, and wherein the measurement transducer has at least one control and evaluation unit.

Moreover, the invention relates to the use of a magnetic-inductive flowmeter for determining the flow profile of a fluid flowing through a measuring tube, wherein the flowmeter has at least one measurement transducer and at least one measurement sensor, wherein the measurement sensor has at least one measuring tube, at least a first coil for generating a first magnetic field within the measuring tube, at least a second coil for generating a second magnetic field within the measuring tube, at least a first electrode and at least a second electrode, wherein the first electrode and the second electrode are arranged on the measuring tube for measuring a voltage occurring in the fluid, and wherein the measurement transducer has at least one control and evaluation unit.

Description of Related Art

Determining the flow of a medium flowing through the measuring tube by means of a magnetic-inductive flowmeter is known from the prior art. Such a flowmeter uses the principle of electromagnetic induction for determining the speed of flow of the medium. For this, a magnetic-inductive flowmeter normally has at least two coils supplied with current, which are arranged on the measuring tube so that they generate a magnetic field within the measuring tube during operation, which has at least one component running perpendicular to the direction of flow. Due to the deflection of the charged particles present in the fluid, a voltage is created within the fluid that can be determined by means of electrodes located on the measuring tube. The speed at which the fluid flows through the measuring tube can be determined from the measured voltage.

It is thereby fundamentally assumed that the speed distribution of the flow profile of the fluid is uninterrupted and, thus, is symmetrical.

After a curve, a reduction or expansion of the measuring tube, or after elements jutting into the measuring tube, however, the flow profile can be interrupted. Such an interruption can cause a vertical and/or horizontal asymmetry of the flow profile. If the speed of the flow is determined in the area of the interrupted flow profile and if the interruption of the flow profile is not taken into account, then determination of the speed or the volume flow derived from it is erroneous.

It is known from European Patent Application EP 1 275 940 A2 and corresponding U.S. Pat. No. 6,634,238 B2 to temporarily generate a significantly asymmetrical magnetic field in respect to the longitudinal axis of the measuring tube for monitoring the flow profile with a magnetic-inductive flowmeter, to measure the drop in voltage between the electrodes and to compare it to the corresponding values, to which the flowmeter is calibrated. A deviation for the calibrated standard thereby indicates an interruption in the flow profile.

European Patent Application EP 0 641 999 A1 and corresponding U.S. Pat. No. 5,493,914 relate to a method for determining the speed of flow of a fluid using a magnetic-inductive flowmeter, wherein a correcting function is provided that corrects the voltage between the electrodes, approximately proportional to the speed of the fluid at concordant magnetic fields into an output signal proportional to the speed of the fluid, wherein the correcting function, for example, is formed by the quotient of the voltage corresponding to the inversely arranged magnetic fields and the voltage corresponding to the concordant magnetic fields. In detail, a difference is made between a correcting function for a flowing movement of the fluid and for a shooting movement of the fluid.

European Patent Application EP 0 770 855 A1 and corresponding U.S. Pat. No. 5,646,353 disclose a method for measuring the average speed of flow of a liquid flowing in a measuring tube using a magnetic-inductive flowmeter, wherein the coil for generating a magnetic field is supplied with current flowing both concordantly and inversely and wherein the flow index of the liquid, which characterizes the deviation from Newtonian behavior, is determined from the voltage tapped at electrodes supplied with current flowing inversely between them and the voltage tapped at electrodes supplied with concordantly flowing current.

Thus, it is basically known from the prior art to detect interference of the symmetrical flow profile.

SUMMARY OF THE INVENTION

Based on the prior art, the object of the present invention is to provide a method, with which the flow profile of the fluid flowing through the measuring tube can be particularly accurately determined. Furthermore, an object of the present invention is to provide a measurement transducer and a corresponding magnetic-inductive flowmeter as well as the use of a magnetic-inductive flowmeter for determining the flow profile of a fluid flowing through a measuring tube.

According to a first teaching of the present invention, the above object is achieved by a method described in the introduction in that a means for generating a reference potential is provided and that the method comprises the following steps:

supplying the first coil with current for generating a first magnetic field with a first exciting current, supplying the second coil with current for generating a second magnetic field with a second exciting current, measuring a first voltage $E_1$ at the first electrode compared to the reference potential, measuring a second voltage $E_2$ at the second electrode compared to the reference potential, determining the vertical and/or horizontal asymmetry of the flow profile from the first measured voltage value $E_1$ and from the second measured voltage value $E_2$.

It has been acknowledged according to the invention that the flow profile of the fluid in a measuring tube of a magnetic-inductive flowmeter can be particularly accurately determined when the voltage drop in the individual sections of the measuring tube or of the flow cross section is separately measured in comparison to a reference potential. The voltage drop in the individual sections is, in particular, dependent on the magnetic field within the measuring tube as well as on the speed distribution of the fluid at the measuring site. By varying the magnetic field within the measuring tube or, respectively, the magnetic fields generated by the individual coils, different measuring states can be generated, which is explained in more detail below. The flow profile in the individual sections can be characterized by the impact of different magnetic fields by separately measuring the voltages $E_1$ and $E_2$ at each electrode in the different measuring states.

According to one implementation, the first and the second exciting current have the same current strength, so that the first magnetic field and the second magnetic field are formed symmetrically within the measuring tube. The first and the second coil are, in particular, connected in series. Alternatively, the flow of current can also be carried out independently from one another using separate circuits. It is also possible that the exciting currents have different current strengths.

The reference potential preferably has a mass potential and, in particular, is designed as a reference electrode or as a grounding ring.

In a preferred implementation, the first and the second electrode are arranged diametrically in such a manner that the connecting line of the electrodes is arranged perpendicular in respect to a concordant magnetic field generated by the coil for determining the speed of flow of the fluid. The means for generating the reference potential is preferably arranged at an angle of about 90° to the electrodes. This design has the advantage that, depending on the formation of the magnetic field, both a vertical as well as a horizontal asymmetry of the flow profile can be determined.

According to a further advantageous implementation, the first and the second coil are supplied with current in such a manner that the first magnetic field and the second magnetic field have the same direction, wherein determining the horizontal asymmetry of the flow profile is carried out using the comparison of the first measured voltage $E_1$ and the second measured voltage $E_2$. In particular, when the electrodes and the means for generating a reference potential are arranged as described above, a horizontal asymmetry of the flow profile can be particularly easily determined with the implementation of the method. Thereby, the measured voltage $E_1$ is a measure for the deflection of the charged particles, for example, in the left half of the measuring tube, while the measured voltage $E_2$ is a measure for the deflection of the charged particles, for example, in the right half of the measuring tube. Thereby, $E_1$ and $E_2$ differ in their algebraic sign. The absolute value of the measured voltages $E_1$ and $E_2$ is, in this respect, each a measure for the speed of the fluid, for example, in the right and the left halves of the measuring tube. It is particularly preferred that the speed of flow of the fluid is determined from the measured voltages $E_1$ and $E_2$.

For assessing whether a horizontal asymmetry of the flow profile is present, the voltages $E_1$ and $E_2$ are compared to one another, in particular the absolute values of the voltages $E_1$ and $E_2$ by forming a quotient or by forming a sum or difference. If the comparison of the voltages differs from a predetermined threshold, this is ascribed to a horizontal asymmetry of the flow profile. Preferably, the flow profile has an asymmetric interference when the difference from the threshold is outside of a tolerance range around the threshold. The tolerance range in a preferred implementation is 10% of the threshold, in a particularly preferred implementation, it is 5% of the threshold and in a further particularly preferred implementation, it is 2% of the threshold. Thereby, the asymmetry is greater, the greater the deviation from the threshold.

According to a further advantageous implementation, the first and the second coil are supplied with current alternately or before or after, in terms of time, generating magnetic fields having the same direction, so that the first and the second magnetic field oppose one another and that determining the vertical asymmetry of the flow profile is carried out using the first measured voltage value El and the second measured voltage value $E_2$. In particular when the electrodes and the means for generating a reference potential are arranged as described above, a vertical asymmetry in each half of the flow profile can be particularly easily determined with this implementation of the method.

If the first electrode is arranged on the left half of the measuring tube and the second electrode is arranged on the right half of the measuring tube, then, as described above, first the voltage $E_1$ drop in the left half and the voltage $E_2$ drop in the right half of the measuring tube are determined.

If the vertical flow profile in the right or the in the left half of the measuring tube is symmetrical, then the voltage $E_1$ or $E_2$ is 0 V. If the flow profile, for example, in the left half of the measuring tube is not symmetrical vertically, then $E_1 \neq 0$ V. If the flow profile in the right half of the measuring tube is not symmetrical vertically, then $E_2 \neq 0$ V. If the absolute value, however, of $E_1$ and $E_2$ is the same, then the vertical asymmetry on both sides of the measuring tube is identical on average. However, if the absolute value of the measured voltage is different, i.e. $|E_1| \neq |E_2|$, then the flow profile has a vertical asymmetry and, additionally, a horizontal asymmetry on both sides.

According to a particularly preferred implementation, the first coil and the second coil are supplied with current in a first measurement state $M_1$ so that the first and the second magnetic field have the same direction and at least the first measured voltage value $E_1$ and the second measured voltage value $E_2$ are determined and the first coil and the second coil are supplied with current in a second measurement state $M_2$ so that the first and the second magnetic field are opposed to one another and at least the first measured voltage value $E_1$ and the second measured voltage value $E_2$ are determined, and determining the vertical and horizontal asymmetry is carried out using the measured voltage values $E_1$ and $E_2$ determined in the first measurement state $M_1$ and using the measured voltage values $E_1$ and $E_2$ determined in the second measurement state $M_2$. It is particularly preferred in this design that the first and the second electrode and the means for generating a reference potential are arranged as described above.

Illustratively, the flow profile can be divided into four quadrants, wherein, by means of the above-described implementation, both a vertical asymmetry within the right and left halves can be determined as well as a horizontal asymmetry between the right and the left half. For this, in particular, the measured voltages $E_1$ and $E_2$ measured in the first measurement state $M_1$ and the measured voltages $E_1$ and $E_2$ measured in the second measurement state $M_2$ are evaluated together. In particular, the absolute value of the quotients of the voltage values $$Q_{M1} = \left|\frac{E_1}{E_2}\right|$$

measured in the first measurement state $M_1$ and the voltage values $$Q_{M2} = \left|\frac{E_1}{E_2}\right|$$

measured in the second measurement state $M_2$ are formed.

If $Q_{M1}=1$, then the flow profile, on average, has no horizontal asymmetry, in particular between the right and the left halves of the measuring tube. If $Q_{M1} \neq 1$, then the flow profile has a horizontal asymmetry.

If $Q_{M2}=1$, then the flow profile has a vertical asymmetry, in particular between the upper and the lower halves of the measuring tube. If $Q_{M2} \neq 1$, then the flow profile has a vertical and a horizontal asymmetry.

Additionally, information about the vertical asymmetry in each half can be obtained from the evaluation of the measured voltages $E_1$ and $E_2$ measured in the second measurement state $M_2$.

In this manner, the flow profile in each of the four quadrants can be at least qualitatively determined.

It is particularly preferred that, additionally, the speed of flow of the fluid is determined from the measured voltages $E_1$ and $E_2$ measured in the first measurement state $M_1$. It is also particularly preferred to take the measured flow profile into account when determining the flow using the speed of flow.

According to a further advantageous implementation, the first and the second coil are supplied with current in an additional measurement state, so that the magnetic field of each coil is reversed, wherein at least the first measured voltage $E_1$ and the second measured voltage $E_2$ are determined and wherein the first measured voltage $E_1$ and the second measured voltage $E_2$ are taken into account in determining the vertical and/or horizontal asymmetry of the flow profile.

This implementation is, in particular, advantageous when the first coil and the second coil are supplied with current in a first measurement state $M_1$ so that the first and the second magnetic field have the same direction, when the first coil and the second coil are supplied with current in a second measurement state $M_2$ so that the first and the second magnetic field are opposed to one another and when the first and the second coil are supplied with current opposite to the second measurement state $M_2$ in a third measurement state $M_3$ so that the first and the second magnetic field are aligned opposing one another, however reversed in respect to the second measurement state $M_2$. Additionally, the measured voltage $E_1$ and $E_2$ is determined at the first and the second electrode in each measurement state $M_1$, $M_2$, $M_3$.

A further differentiation of the possible flow profiles can be carried out due to the additional consideration of the opposite, inverse magnetic fields.

According to a further advantageous implementation, the speed of flow of the medium is determined from measured voltages $E_1$ and $E_2$ measured in magnetic fields having the same direction.

It is advantageous when a plurality of flow profiles in the form of different voltage ratios between the first and the second electrode, in particular taking into account different measurement states, is stored in the evaluation unit and when determining the vertical and/or horizontal asymmetry of the flow profile by means of a query takes place in respect to these voltage ratios.

For example, the type of flow profiles displayed in the table below can be qualitatively differentiated, wherein Q1 to Q4 each indicate one quadrant of the flow profile, and wherein, in detail the quadrants are arranged as Q1 upper left, Q2 upper right, Q3 lower left and Q4 lower right:

| Type | Q1 | Q2 | Q3 | Q4 |
|------|------|------|------|------|
| A | normal | normal | normal | normal |
| B | fast | fast | slow | slow |
| C | fast | slow | fast | slow |
| D | fast | slow | slow | slow |
| E | fast | slow | slow | fast |
| F | slow | normal | normal | normal |

The individual types A to F of the flow profile have the following measured voltages $E_1$ and $E_2$ in the first measurement state $M_1$:

| Type | Differential | $\|E_1\|$ | $\|E_2\|$ | $\left\|\frac{E_1}{E_2}\right\|$ | $\|E_1 - E_2\|$ |
|------|------|------|------|------|------|
| A | $E_v$ | $E_v/2$ | $E_v/2$ | 1 | $E_v$ |
| B | $E_v$ | $E_v/2$ | $E_v/2$ | 1 | $E_v$ |
| C | $E_v$ | $E_v/2$ + Offset | $E_v/2$ − Offset | $S_l/S_r$ | $E_v$ |
| D | $E_v$ | $E_v/2$ + Offset | $E_v/2$ − Offset | $S_l/S_r$ | $E_v$ |
| E | $E_v$ | $E_v/2$ | $E_v/2$ | 1 | $E_v$ |
| F | $E_v$ | $E_v/2$ − Offset | $E_v/2$ | $S_l/S_r$ | $E_v$ |

Thereby, the deflection of the charged particles within the fluid in the first measurement state $M_1$ corresponds to the deflection for determining the speed v of the fluid. Accordingly, the measured voltages $E_1$ and $E_2$ can be compared to the measured value $E_v$ relevant for flow measurement.

In the table above, the differential corresponds to the potential difference between the first and the second electrode. The specification $E_v$ indicates the measured voltage for determining the speed v of flow of the flowing fluid. If the given measured value for $E_1$ or $E_2$ deviates by an offset upward or downward from (half of) the measured value for the flow determination $E_v$, then this is attributed to a fast or slow speed of flow deviating from the normal speed of flow. In particular, the values for the quotients $E_1/E_2$ given in the fifth column indicate a horizontal asymmetry between the left and right halves of the measuring tube. In cases, in which a horizontal average is present on average, i.e. in the flow profile types A, B and E, $$\left|\frac{E_1}{E_2}\right| = 1.$$

If the flow profile has different speeds on average and thus different absolute values of the measured voltages in the right and in the left halves of the measuring tube, then $$\left|\frac{E_1}{E_2}\right|$$

is a measure for the asymmetry between the left flow profile $S_l$ and the right flow profile $S_r$.

In the second measurement state $M_2$, the following values result for the designated flow profile types:

| Type | Differential | $|E_1|$ | $|E_2|$ | $\left|\frac{E_1}{E_2}\right|$ | $|E_1 - E_2|$ |
|---|---|---|---|---|---|
| A | 0 | 0 | 0 | 1 | 0 |
| B | Offset*2 | Offset | Offset | $S_o/S_u$ | Offset*2 |
| C | 0 | 0 | 0 | 1 | 0 |
| D | Offset | Offset | 0 | $S_o/S_u$ | Offset |
| E | 0 | Offset | Offset | 1 | 0 |
| F | Offset | Offset | 0 | $S_o/S_u$ | Offset |

Since the deflection of the charged particles in the fluid in the second measurement state $M_2$ deviates from the direction of the deflection of the particles for measuring the speed of flow due to the inversely acting magnetic fields, the measured voltages $E_1$ and $E_2$ determined in the second measurement state $M_2$ are unable to provide information in respect to the speed of flow v. Moreover, only one voltage $E_1$ and/or $E_2$ is measured in the left or the right half of the measuring tube in the second measurement state $M_2$ when a vertical asymmetrical flow profile is present in the left or in the right half of the measuring tube. If the vertical flow profile in view of the speed of flow is symmetrical in one half of the measuring tube, voltage cannot be measured at the electrode. In the above table, the ratio $$\left|\frac{E_1}{E_2}\right|$$

is thus a measure for the asymmetry between the upper flow profile $S_o$ and the lower flow profile $S_u$.

A reversal of the direction of the exciting current in a third measurement state $M_3$ causes a change in the algebraic sign of the measured voltages.

By measuring the voltages $E_1$ and $E_2$ in the first measurement state $M_1$ and in the second measurement state $M_2$ and, preferably, also in a third measurement state $M_3$, the fluid can thus be assigned one of the flow profile types A to F shown above.

Preferably, the following algorithm is stored in the evaluation unit for this:

- Measure M1
  - quotient_1 = E1/E2
- Measure M2
  - E1_2 = E1
  - E2_2 = E2
  - quotient_2 = E1/E2
  - sum_2 = E1 + E2
  - delta_2 = E1 − E2
- Measure M2 with reversed magnetic field
  - sum_2_rev = E1 + E2
- If (quotient_2 = 1) AND (quotient_1 = 1) then
  - If (sum_2 = sum_2_rev) then FLOWPROFILE_A
  - If (sum_2 ≠ sum_2_rev) then FLOWPROFILE_E
- If not(FLOWPROFILE_A) or not(FLOWPROFILE_E) and (quotient_1=1) then FLOWPROFILE_B
- If not(FLOWPROFILE_A or FLOWPROFILE_E or FLOWPROFILE_B) and (quotient_2=1) then FLOWPROFILE_C As long as none of the flow profile types A, B, C, or E is detected, then a flow profile is present, in which one quadrant has a significantly higher or lower speed than the other three quadrants (flow profile D or F).

The following algorithm can, for example, be used to further identify the flow profile type:

- If (E2_2 = 0) and (E1_2 > 0) and (quotient_1 = "left part") then FLOWPROFILE_D_Q1_fast
- If (E2_2 = 0) and (E1_2 < 0) and (quotient_1 = "left part") then FLOWPROFILE_D_Q3_fast
- If (E1_2 = 0) and (E2_2 > 0) and (quotient_1 = "right part") then FLOWPROFILE_D_Q2_fast
- If (E1_2 = 0) and (E2_2 < 0) and (quotient_1 = "right part") then FLOWPROFILE_D_Q4_fast
- If (E2_2 = 0) and (E1_2 < 0) and (quotient_1 = "right part") then FLOWPROFILE_F_Q1_slow
- If (E2_2 = 0) and (E1_2 > 0) and (quotient_1 = "right part") then FLOWPROFILE_D_Q3_slow
- If (E1_2 = 0) and (E2_2 < 0) and (quotient_1 = "left part") then FLOWPROFILE_D_Q2_slow
- If (E1_2 = 0) and (E2_2 > 0) and (quotient_1 = "left part") then FLOWPROFILE_D_Q4_slow In addition to the above-described exemplary specific flow profile types and the algorithm for classifying the profile types using the measured voltages, further flow profile types with other speed distributions can, of course, be differentiated from one another and, in particular, can be classified into different measurement states by means of a measurement of the voltages $E_1$ and $E_2$.

According to a second teaching, the object described in the introduction is achieved by a measurement transducer for connection to a measurement sensor of a magnetic-inductive flowmeter, comprising a control and evaluation unit, in that the control and evaluation unit is designed for carrying out one of the above described methods for determining the flow profile.

According to a third teaching of the present invention, the object described in the introduction is achieved by a magnetic-inductive flowmeter as described in the introduction in that a means for generating a reference potential is provided and that the evaluation unit is designed so that it determines the vertical and/or horizontal asymmetry of the flow profile from the measured voltages measured at the electrodes, wherein the measured voltages are measured in comparison to the reference potential.

According to a particularly preferred design, the flowmeter carries out one of the above-described methods during operation.

According to a fourth teaching of the present invention, the object described in the introduction is also achieved by the use mentioned in the introduction in that a means for generating a reference potential is provided and that the evaluation unit is designed so that it determines the vertical and/or horizontal asymmetry of the flow profile from the measured voltages measured at the electrodes, wherein the measured voltages are measured in comparison to the reference potential.

It has been acknowledged according to the invention that a magnetic-inductive flowmeter can be used not only for determining the flow, but it is also possible to determine horizontal and/or vertical asymmetries of the flow profile. Thus, the flow profile can be taken into account in determining the speed of flow, whereby the accuracy of the measurement or, respectively, the flowmeter is improved.

According to a preferred design, the flowmeter is designed as described above and/or the flowmeter carries out one of the above-described methods during operation.

In detail, there is a plurality of possibilities for designing and further developing the method according to the invention, the flowmeter according to the invention and the use according to the invention as will be apparent from the following description of preferred embodiments in conjunction with the accompanying drawings.

DETAILED DESCRIPTION OF THE INVENTION

Figure 1:
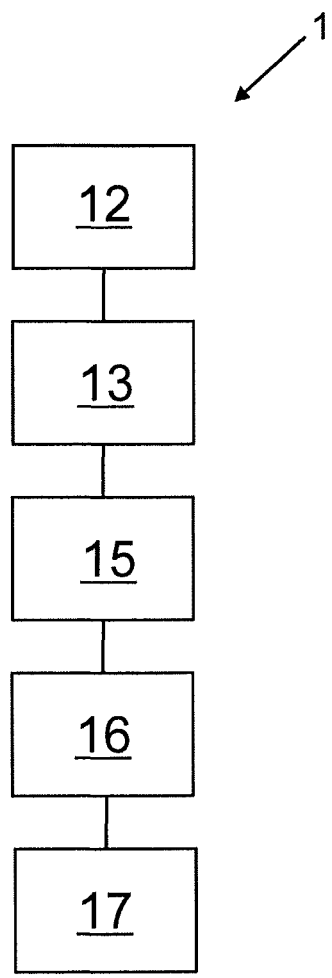
FIG. 1 is a flow chart of a first embodiment of a method according to the invention.
Figure 6:
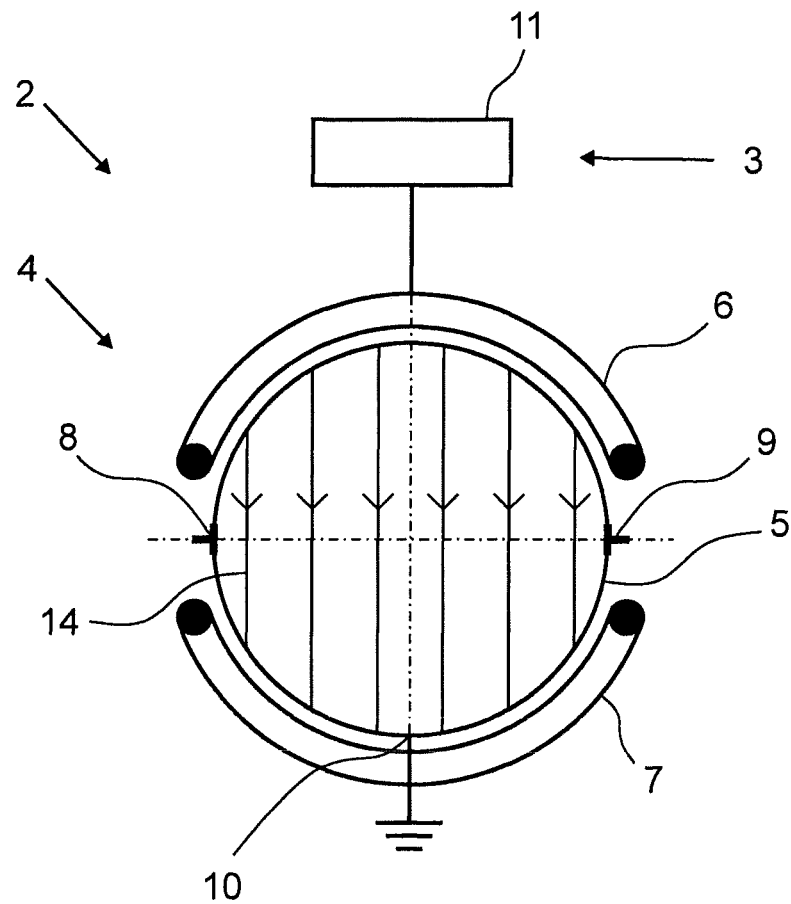
FIG. 6 shows a first embodiment of a device according to the invention.

A first embodiment of a method 1 for determining the flow profile in the measuring tube 5 of a magnetic-inductive flowmeter 2 is shown in FIG. 1. For this, the flowmeter 2 has a measurement transducer 3 and a measurement sensor 4, as shown in FIG. 6. The measurement sensor 4 has a measuring tube 5, a first coil 6 for generating a first magnetic field within the measuring tube 5, a second coil 7 for generating a second magnetic field within the measuring tube 5, a first electrode 8 and a second electrode 9 and a reference electrode 10. The first electrode 8 and the second electrode 9 are arranged diametrically on the measuring tube 5 for measuring a voltage occurring in the fluid. The reference electrode 10 is arranged at an angle of each around 90° to the first electrode 8 and the second electrode 9. The measurement transducer 4 has an evaluation unit 11. As an alternative to the reference electrode 10, a grounding ring can also be provided.

In a first step 12 of the method 1 shown in FIG. 1, the first coil 6 is now supplied with a first exciting current for generating a first magnetic field within the measuring tube 5. Additionally, the second coil 7 is supplied with a second exciting current for generating a second magnetic field 13.

In the illustrated embodiment, the first coil 6 and the second coil 7 are supplied with current so that the first magnetic field and the second magnetic field have the same direction. The individual magnetic fields are superimposed on one another to form an overall magnetic field 14 shown in FIG. 6.

In a next step 15 of the method, a first voltage $E_1$ is measured at the first electrode 8 in comparison to the reference potential 10 and furthermore, a second voltage $E_2$ is measured at the second electrode 9 in comparison to the reference potential 16. Then, the measured voltages $E_1$ and $E_2$ are compared to one another 17. For this, presently, the quotient $$\left|\frac{E_1}{E_2}\right|$$

is formed. If $$\left|\frac{E_1}{E_2}\right| \neq 1,$$

taking a tolerance range into account, then a horizontal asymmetry is present between the right and the left halves of the flow profile.

Additionally, the speed of flow v of the fluid can be determined from the measured voltages $E_1$ and $E_2$.

Figure 2:
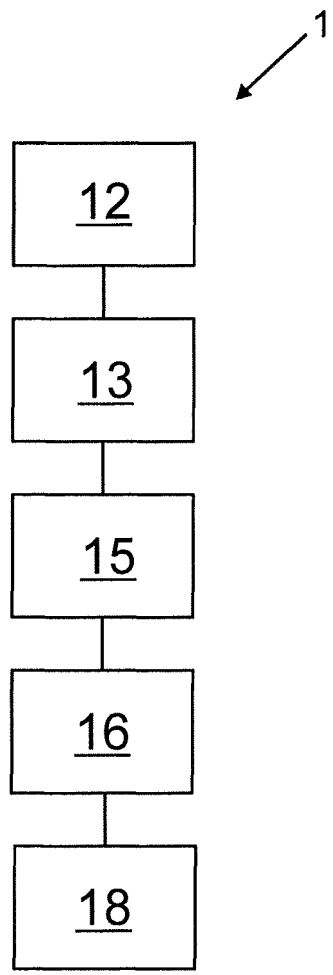
FIG. 2 is a flow chart of a second embodiment of a method according to the invention.
Figure 7:
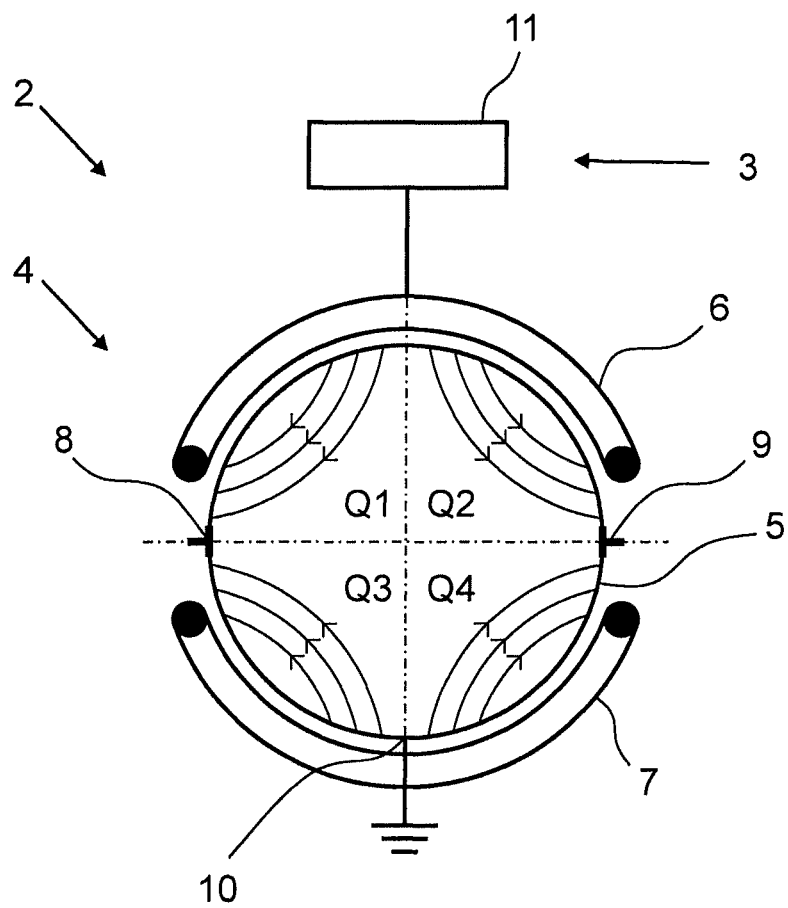
FIG. 7 shows a second embodiment of a device according to the invention.

FIG. 2 shows a second embodiment of a method 1 for determining the flow profile in the measuring tube 5 of a magnetic-inductive flowmeter 2, wherein the flowmeter 2 is designed according to the flowmeter shown in FIG. 7. In detail, a measurement transducer 3 and a measurement sensor 4 are also provided, wherein the measurement sensor 4 has a measuring tube 5, a first coil 6 for generating a first magnetic field within the measuring tube 5, a second coil 7 for generating a second magnetic field within the measuring tube 5, a first electrode 8 and a second electrode 9, and a reference electrode 10. As an alternative to the reference electrode 10, a grounding ring can also be provided. The first electrode 8 and the second electrode 9 are arranged diametrically on the measuring tube 5 for measuring a voltage occurring in the fluid and the reference electrode 10 is arranged at an angle of each 90° to the first electrode 8 and to the second electrode 9. The measurement transducer has a control and evaluation unit 11.

In a first step 12 of the method 1 shown in FIG. 2, the first coil 6 is now supplied with a first exciting current for generating a first magnetic field within the measuring tube 5. Additionally, in step 13, the second coil 7 is supplied with a second exciting current for generating a second magnetic field within the measuring tube 5. Thereby, the first 6 and the second coil 7 are supplied with current so that the first and the second magnetic field have opposing directions. As a result, the magnetic field shown in FIG. 7 prevails within the measuring tube 5. Illustratively, the measuring tube cross section can be divided into four quadrants Q1 to Q4, wherein, by means of the method shown in FIG. 2, a vertical asymmetry can be determined between Q1 and Q3, or respectively, Q2 and Q4.

In a next step 15 of the method, a first voltage $E_1$ is measured at the first electrode 8 in comparison to the reference potential 10 and, furthermore, in step 16, a second voltage $E_2$ is measured at the second electrode 9 in comparison to the reference potential 10.

Subsequently, the voltages $E_1$ and $E_2$ are evaluated in step 18 for determining a vertical asymmetry of the flow profile. If the value of the voltage $E_1 \neq 0$, then the flow profile in the quadrants Q1 and Q3 of the left half of the measuring tube cross section is asymmetrical. If the value of the voltage $E_2 \neq 0$, then the flow profile in the quadrants Q2 and Q4 of the right half of the measuring tube cross section is asymmetrical.

Figure 3:
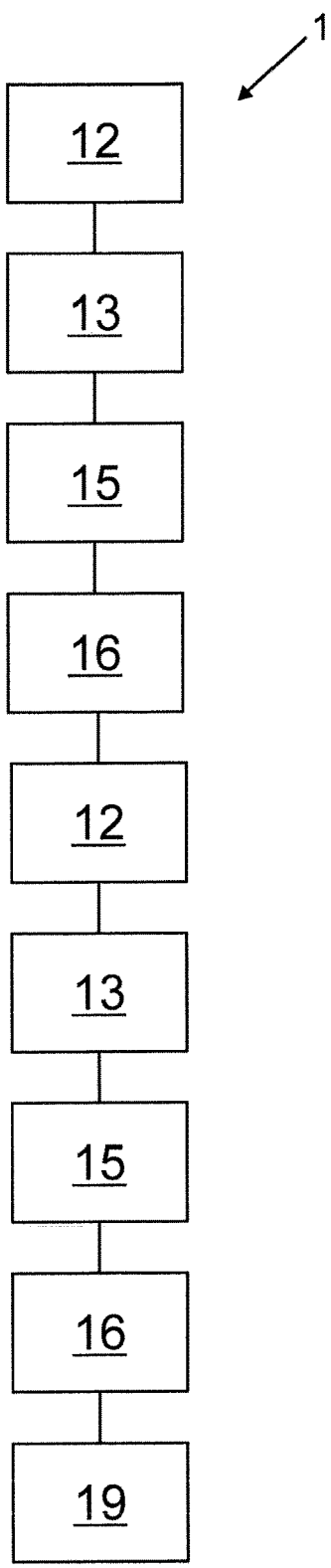
FIG. 3 is a flow chart of a third embodiment of a method according to the invention.

FIG. 3 shows a third embodiment of a method 1 for determining the flow profile in a measuring tube 5 of a magnetic-inductive flowmeter 2, wherein the flowmeter 2 has a measurement transducer 3 and a measurement sensor 4, wherein the measurement sensor 4 has a measuring tube 5, a first coil 6 for generating a first magnetic field within the measuring tube 5, a second coil 7 for generating a second magnetic field within the measuring tube 5, a first electrode 8 and a second electrode 9, and a reference electrode 10. The first electrode 8 and the second electrode 9 are arranged diametrically on the measuring tube 5 for measuring a voltage occurring in the fluid and the reference electrode 10 is arranged at an angle of each 90° to the first electrode 8 and the to the second electrode 9. The measurement transducer has a control and evaluation unit 11.

In a first step 12 of the method 1 shown in FIG. 3, the first coil 6 is now supplied with a first exciting current for generating a first magnetic field within the measuring tube 5. Additionally, in step 13, the second coil 7 is supplied with a second exciting current for generating a second magnetic field within the measuring tube 5. Thereby, the first 6 and the second coil 7 are supplied with current so that the first and the second magnetic field have the same direction, as shown in FIG. 6. This corresponds to the first measurement state $M_1$ of the method 1. Then, the voltages $E_1$ and $E_2$ are determined in steps 15 and 16.

In a next step 12, the first coil 6 is supplied again with a current and, furthermore, in step 13, the second coil 7 is supplied with a current, wherein the coils 6, 7 are supplied with a current so that the first magnetic field and the second magnetic field are opposite one another, as shown in FIG. 7. This corresponds to the second measurement state $M_2$ of the method 1.

Subsequently, the voltages $E_1$ and $E_2$ are determined in steps 15 and 16. Finally, the evaluation 19 of the voltages $E_1$ and $E_2$ of the first measurement state $M_1$ and the second measurement state $M_2$ is carried out for qualitative determination of the flow profile. In the scope of the evaluation 19, it is determined, on the one hand by comparing the voltages $E_1$ and $E_2$ of the first measurement state $M_1$, as already described in reference to FIG. 1, whether a horizontal asymmetry is present between the left and the right halves of the flow profile. Furthermore, as is described in reference to FIG. 2, the voltages $E_1$ and $E_2$ of the second measurement state $M_2$ are evaluated for determining a vertical asymmetry.

Figure 4:
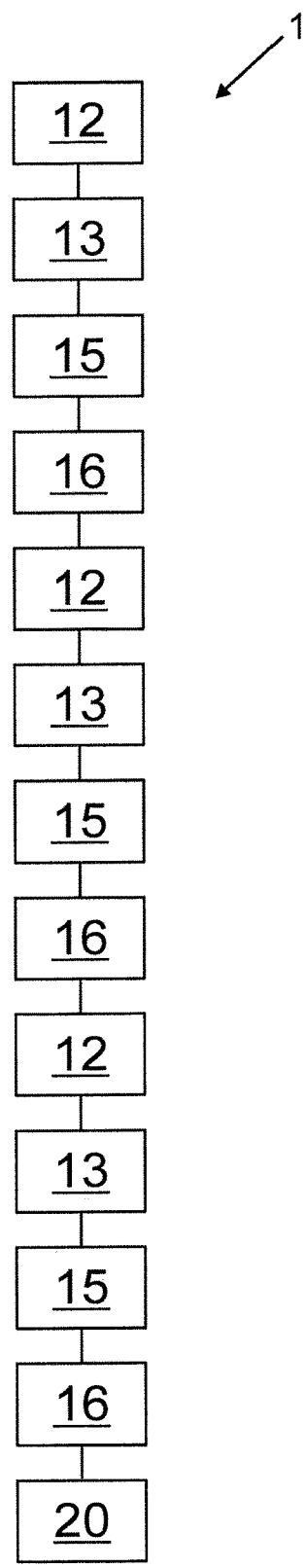
FIG. 4 is a flow chart of a fourth embodiment of a method according to the invention.

FIG. 4 shows a fourth embodiment of a method 1 for determining the flow profile in the measuring tube 5 of a magnetic-inductive flowmeter 2. As in the embodiment shown in FIG. 3, the voltages $E_1$ and $E_2$ are determined in a first measurement state $M_1$, wherein a magnetic field having one direction is present within the measuring tube and, subsequently, the voltages are determined a second measurement state $M_2$, wherein a reversed magnetic field is present in the measuring tube 5. In a subsequent step 12, 13, the first coil 6 and the second coil 7 are supplied with current, so that an inversely arranged magnetic field is present in the measuring tube 5, wherein each magnetic field is inverted in comparison to the second measuring state. This corresponds to the third measurement state $M_3$. In this measurement state, the voltage $E_1$ and the voltage $E_2$ are also determined 15, 16. In the subsequent evaluation 20, the flow profile is determined under consideration of the voltages $E_1$ and $E_2$ of all three measurement states $M_1$, $M_2$, $M_3$.

Figure 5:
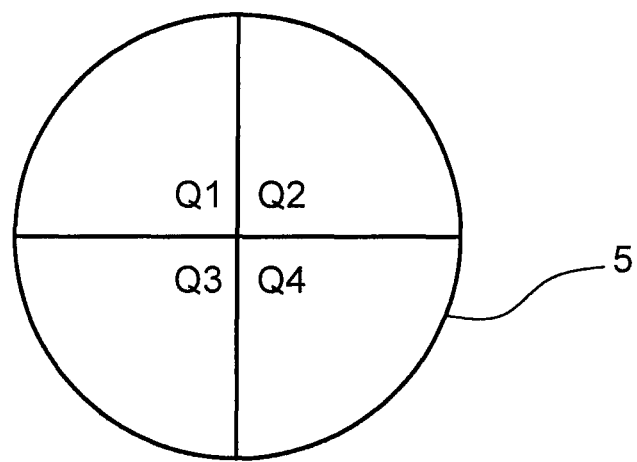
FIG. 5 is a schematic representation of different flow profiles of the fluid.

FIG. 5 shows a representation of the measuring tube cross section of the measuring tube 5 with fluid flowing through it, wherein the measuring tube cross section and, thus, the flow profile is divided into four quadrants Q1 to Q4. By means of the method described in FIG. 4, the following flow profile types can now be differentiated, wherein the individual types, as listed in the following table, differ by qualitative information of the speeds in the individual quadrants:

| Type | Q1 | Q2 | Q3 | Q4 |
|---|---|---|---|---|
| A | normal | normal | normal | normal |
| B | fast | fast | slow | slow |
| C | fast | slow | fast | slow |
| D | fast | slow | slow | slow |
| E | fast | slow | slow | fast |
| F | slow | normal | normal | normal |

In the first measurement state $M_1$, the above-mentioned flow profile types can be differentiated as follows:

| Type | Differential | $\|E_1\|$ | $\|E_2\|$ | $\left\|\frac{E_1}{E_2}\right\|$ | $\|E_1 - E_2\|$ |
|---|---|---|---|---|---|
| A | $E_v$ | $E_v/2$ | $E_v/2$ | 1 | $E_v$ |
| B | $E_v$ | $E_v/2$ | $E_v/2$ | 1 | $E_v$ |
| C | $E_v$ | $E_v/2$ + Offset | $E_v/2$ − Offset | $S_f/S_r$ | $E_v$ |
| D | $E_v$ | $E_v/2$ + Offset | $E_v/2$ − Offset | $S_f/S_r$ | $E_v$ |
| E | $E_v$ | $E_v/2$ | $E_v/2$ | 1 | $E_v$ |
| F | $E_v$ | $E_v/2$ − Offset | $E_v/2$ | $S_f/S_r$ | $E_v$ |

In the second measurement state $M_2$, the following values result for the mentioned flow profile types:

| Type | Differential | $\|E_1\|$ | $\|E_2\|$ | $\left\|\frac{E_1}{E_2}\right\|$ | $\|E_1 - E_2\|$ |
|---|---|---|---|---|---|
| A | 0 | 0 | 0 | 1 | 0 |
| B | Offset*2 | Offset | Offset | $S_o/S_u$ | Offset*2 |
| C | 0 | 0 | 0 | 1 | 0 |
| D | Offset | Offset | 0 | $S_o/S_u$ | Offset |
| E | 0 | Offset | Offset | 1 | 0 |
| F | Offset | Offset | 0 | $S_o/S_u$ | Offset |

Determining the flow profile takes place in the shown embodiment using the following algorithm:

- Measure M1
  - quotient_1 = E1/E2
- Measure M2
  - E1_2 = E1
  - E2_2 = E2
  - quotient_2 = E1/E2
  - sum_2 = E1 + E2
  - delta_2 = E1 − E2
- Measure M2 with reversed magnetic field
  - sum_2_rev = E1 + E2
- If (quotient_2 = 1) AND (quotient_1 = 1) then
  - If (sum_2 = sum_2_rev) then FLOWPROFILE_A
  - If (sum_2 ≠ sum_2_rev) then FLOWPROFILE_E
- If not(FLOWPROFILE_A) or not(FLOWPROFILE_E) and (quotient_1=1) then FLOWPROFILE_B
- If not(FLOWPROFILE_A or FLOWPROFILE_E or FLOWPROFILE_B) and (quotient_2=1) then FLOWPROFILE_C As long as none of the flow profile types A, B, C or E are detected, then a flow profile is present, in which one quadrant has a significantly higher or lower speed than the remaining three quadrants (flow profile D or F).

The following algorithm can, for example, be used for further identifying the flow profile type:

- If (E2_2 = 0) and (E1_2 > 0) and (quotient_1 = "left part") then FLOWPROFILE_D_Q1_fast
- If (E2_2 = 0) and (E1_2 < 0) and (quotient_1 = "left part") then FLOWPROFILE_D_Q3_fast
- If (E1_2 = 0) and (E2_2 > 0) and (quotient_1 = "right part") then FLOWPROFILE_D_Q2_fast
- If (E1_2 = 0) and (E2_2 < 0) and (quotient_1 = "right part") then FLOWPROFILE_D_Q4_fast
- If (E2_2 = 0) and (E1_2 < 0) and (quotient_1 = "right part") then FLOWPROFILE_F_Q1_slow
- If (E2_2 = 0) and (E1_2 > 0) and (quotient_1 = "right part") then FLOWPROFILE_D_Q3_slow
- If (E1_2 = 0) and (E2_2 < 0) and (quotient_1 = "left part") then FLOWPROFILE_D_Q2_slow
- If (E1_2 = 0) and (E2_2 > 0) and (quotient_1 = "left part") then FLOWPROFILE_D_Q4_slow As a result, a method is shown and described, with which the flow profile of a fluid flowing through a measuring tube can be determined in a spatially resolved manner. If this is taken into account in determining the speed of flow or, respectively the flow of the fluid, then the reliability of the determination of the speed of flow or, respectively, the flow is particularly high.

What is claimed is:

1. A method for determining the flow profile in the measuring tube of a magnetic-inductive flowmeter that has at least one measurement transducer and at least one measurement sensor, wherein the measurement sensor has at least one measuring tube, at least a first coil for generating a first magnetic field within the measuring tube, at least a second coil for generating a second magnetic field within the measuring tube, at least a first electrode and at least a second electrode, wherein the first electrode and the second electrode are arranged on the measuring tube for measuring a voltage occurring in the fluid, and wherein the measurement transducer has at least one control and evaluation unit, and wherein a means for generating a reference potential is provided, the method comprising the following steps:
generating a reference potential,
supplying the first coil with current for generating the first magnetic field with a first exciting current,
supplying the second coil with current for generating the second magnetic field with a second exciting current,
measuring a first voltage value $E_1$ between the first electrode and the reference potential,
measuring a second voltage value $E_2$ between the second electrode and the reference potential, and
determining at least one of a vertical or horizontal asymmetry of the flow profile from the first measured voltage value $E_1$ and from the second measured voltage value $E_2$,
wherein the reference potential generated has a mass potential and wherein a reference electrode or a grounding ring is used for generating the reference potential having the mass potential.

2. The method according to claim 1, further comprising supplying the first coil and the second coil with current so that the first magnetic field and the second magnetic field have the same direction and determining horizontal asymmetry of the flow profile using a comparison of the first measured voltage value $E_1$ and the second measured voltage value $E_2$ to one another.

3. The method according to claim 1, further comprising supplying the first coil and the second coil with current so that the first and the second magnetic field oppose one another and vertical asymmetry of the flow profile is performed using the first measured voltage value $E_1$ and the second measured voltage value $E_2$.

4. The method according to claim 1, wherein the first coil and the second coil are supplied with current in a first measurement state $M_1$ so that the first and the second magnetic fields have the same direction, wherein the first coil and the second coil are supplied with current in a second measurement state $M_2$ so that the first and the second magnetic fields are opposed to one another, determining the measured voltage values $E_1$ and $E_2$ in the first measurement state $M_1$ and in the second measurement state $M_2$, and wherein vertical and horizontal asymmetry is determined using the measured voltage values $E_1$ and $E_2$ determined in the first measurement state $M_1$ and using the measured voltage values $E_1$ and $E_2$ determined in the second measurement state $M_2$.

5. The method according to claim 1, wherein the first coil and the second coil are supplied with current in an additional measurement state so that the magnetic field of each coil is inverted and wherein the first measured voltage value $E_1$ and the second measured voltage value $E_2$ are taken into account in determining said at least one of the vertical or horizontal asymmetry of the flow profile.

6. The method according to claim 1, wherein a plurality of flow profiles in the form of different voltage ratios between the voltage $E_1$ measured at the first electrode and the voltage $E_2$ measured at the second electrode is stored in the evaluation unit and determining of said at least one of the vertical or horizontal asymmetry of the flow profile is performed using a query of the stored voltage ratios.

7. The method according to claim 1, wherein a speed of flow of the fluid is determined from the measured voltage values $E_1$ and $E_2$ measured in magnetic fields having the same direction.

8. A measurement transducer for connection with a measurement sensor of a magnetic-inductive flowmeter, comprising a control and evaluation unit, wherein the control and evaluation unit comprises:
a current supply circuit for supplying a first coil of the flowmeter with current for generating a first magnetic field with a first exciting current,
a current supply circuit for supplying a second coil of the flowmeter with current for generating a second magnetic field with a second exciting current,
means for measuring a first voltage value $E_1$ at a first electrode of the flowmeter with reference to a reference potential generated by the flowmeter,
means for measuring a second voltage value $E_2$ at the second electrode between the second electrode and the reference potential, and
means for determining at least one of a vertical or horizontal asymmetry of the flow profile from the first measured voltage value $E_1$ and from the second measured voltage value $E_2$,
wherein the reference potential generated by the flowmeter has a mass potential and wherein the flowmeter is provided with a reference electrode or a grounding ring for generating the reference potential.

9. A magnetic-inductive flowmeter, comprising:
at least one measurement transducer having at least one control and evaluation unit,
at least one measurement sensor having at least one measuring tube, at least a first coil for generating a first magnetic field within the at least one measuring tube, at least a second coil for generating a second magnetic field within the at least one measuring tube and at least a first electrode and at least a second electrode, and
means for generating a reference potential,
wherein the first electrode and the second electrode are arranged on the measuring tube for measuring a voltage occurring in a fluid flowing within the at least one measuring tube,
wherein the control and evaluation unit has means for determining at least one of vertical or horizontal asymmetry of a flow profile during operation from voltage values $E_1$ and $E_2$ measured between the electrodes and the reference potential,
wherein the reference potential generated by the flowmeter has a mass potential and wherein the flowmeter is provided with a reference electrode or a grounding ring for generating the reference potential.

* * * * *